United States Patent
Warren et al.

(10) Patent No.: US 10,533,839 B2
(45) Date of Patent: Jan. 14, 2020

(54) DETERMINATION OF A CLEARANCE AND A POSITION OF A TARGET

(71) Applicant: United Technologies Corporation, Farmington, CT (US)

(72) Inventors: Eli C. Warren, Wethersfield, CT (US); Ian F. Agoos, Boston, MA (US); Darren M. Wind, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/981,112

(22) Filed: May 16, 2018

(65) Prior Publication Data

US 2019/0353473 A1 Nov. 21, 2019

(51) Int. Cl.
*G01B 11/14* (2006.01)

(52) U.S. Cl.
CPC .................. *G01B 11/14* (2013.01)

(58) Field of Classification Search
CPC ............ G01N 2291/044; G01N 29/00; G01N 29/0654; G01N 29/262; G01N 21/8851; G01N 21/954; G01N 2291/2693; G01N 27/025; G01N 27/82; G01N 29/14; G01N 29/46; G01B 11/14; G01B 11/25
See application file for complete search history.

(56) References Cited

U.S. PATENT DOCUMENTS

| | | | |
|---|---|---|---|
| 4,037,473 A * | 7/1977 | Compton | G01J 5/0022 374/125 |
| 4,049,349 A | 9/1977 | Wennerstrom | |
| 4,326,804 A * | 4/1982 | Mossey | G01B 11/14 250/224 |
| 5,017,772 A | 5/1991 | Hafle | |
| 5,625,446 A * | 4/1997 | Bedard | B24B 19/14 356/3.08 |
| 7,722,310 B2 * | 5/2010 | Balasubramaniam | G01B 7/14 324/545 |
| 7,891,938 B2 | 2/2011 | Herron et al. | |

(Continued)

FOREIGN PATENT DOCUMENTS

| | | |
|---|---|---|
| JP | 2012082734 | 4/2012 |
| JP | 2015001414 A | 1/2015 |

OTHER PUBLICATIONS

EP search report for EP19163302.3 dated Sep. 19, 2019.

*Primary Examiner* — Michael P Stafira
(74) *Attorney, Agent, or Firm* — O'Shea Getz P.C.

(57) ABSTRACT

Disclosed is a first transmitter that transmits a first optical signal towards a target, a plurality of receivers that receive the first optical signal after the first optical signal is reflected by the target and each provides a respective received optical signal, at least one photodetector that receives the received optical signals and provides at least a first electrical signal, and a processor that receives the first electrical signal to compute a position of the target relative to a baseline position based on: a first position of a first receiver of the plurality of receivers, a second position of a second receiver of the plurality of receivers, the first electrical signal. The processor computes a clearance between the target and a component based on a third position of a third receiver, a fourth position of a fourth receiver and a second electrical signal.

16 Claims, 9 Drawing Sheets

(56) References Cited

U.S. PATENT DOCUMENTS

| | | | |
|---|---|---|---|
| 9,784,120 B2 | 10/2017 | Zielinski et al. | |
| 2010/0171956 A1* | 7/2010 | Sappey | G01M 15/14 |
| | | | 356/432 |
| 2015/0199805 A1* | 7/2015 | Hatcher, Jr. | G01B 11/26 |
| | | | 348/135 |
| 2016/0259035 A1* | 9/2016 | Pandey | G01S 15/89 |
| 2018/0340441 A1 | 11/2018 | Miyamoto | |

* cited by examiner

//H1 DETERMINATION OF A CLEARANCE AND A POSITION OF A TARGET

STATEMENT REGARDING FEDERALLY SPONSORED RESEARCH OR DEVELOPMENTS

This invention was made with Government support under Contract Number W911W6-16-2-0012 awarded by the United States Army. The Government has certain rights in this invention.

BACKGROUND

Engines, such as those which power aeronautical and industrial equipment, may employ a compressor to compress air that is drawn into the engine and a turbine to capture energy associated with a combustion of a fuel-air mixture. The turbine typically includes alternating stages of rotatable and static/non-rotatable structure. The rotatable structure is frequently implemented as a hub/disk coupled to a shaft, with a multiple of blades that are seated by the disk. The blades extend radially from the disk to a distal end/tip. Disposed (e.g., radially disposed) between an engine structure (e.g., case) and the blade tips is a seal that is frequently referred to in the art as a blade outer air seal (BOAS).

The gap/distance between the blade tips and the BOAS, referred to herein as a blade tip clearance (BTC), is subject to change during the operation of the engine. For example, differential thermal growth, engine vibrations/deflections, etc., may cause the BTC to increase or decrease over an operational envelope/profile of the engine. If the BTC is too small, a knife edge associated with the blade tip may cut/dig into the BOAS causing undesirable/premature wear of the BOAS and/or the knife edge. On the other hand, the BTC represents a leakage path with respect to the fuel-air mixture; a large valued BTC leads to inefficiencies (e.g., a large valued BTC reduces fuel efficiency of the engine). Accordingly, the BTC is a parameter that is the subject of great interest.

During, e.g., engine development and/or test, one or more probes may be used to determine what the BTC is for one or more of the blades. It can be difficult to accurately measure the BTC. For example, when a knife edge shifts axially relative to, e.g., the BOAS, the knife edge may not be in the field of view of a probe unless the probe is configured with a sufficiently large field of view. However, if the field of view is too large the probe may obtain reflected energy from, e.g., a blade shroud that is present in the background. The contribution of reflected energy changes the calculated value of the BTC significantly based on axial shifts/displacements of the knife edge, such that the generated BTC may be invalid/incorrect.

Accordingly, what is needed is an ability to characterize an axial shift of the blades/associated knife edge. Furthermore, what is needed is an ability to characterize/determine the BTC with enhanced precision.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system comprising: a first transmitter that transmits a first optical signal towards a target, a plurality of receivers that receive the first optical signal after the first optical signal is reflected by the target and each provides a respective received optical signal, at least one photodetector that receives the received optical signals and provides at least a first electrical signal, and a processor that receives the first electrical signal to compute a position of the target relative to a baseline position based on: a first position of a first receiver of the plurality of receivers, a second position of a second receiver of the plurality of receivers, the first electrical signal. In some embodiments, the system is configured for use on a gas turbine engine, and the gas turbine engine extends along a longitudinal axial centerline, and the first position corresponds to a first axial position relative to the centerline, and the second position corresponds to a second axial position relative to the centerline, and the second axial position is different from the first axial position. In some embodiments, the target includes a turbine blade tip, and the system further comprises: a case, a seal coupled to the case and radially disposed between the case and the turbine blade tip relative to the centerline, a second transmitter that transmits a second optical signal towards the turbine blade tip, the plurality of receivers receive the second optical signal after the second optical signal is reflected by the turbine blade tip and each provides a respective second received optical signal, and the at least one photodetector receives the second received optical signals and provides at least a second electrical signal, where the processor computes a radial clearance between the seal and the turbine blade tip based on: a third position of a third receiver of the plurality of receivers, a fourth position of a fourth receiver of the plurality of receivers, and the second electrical signal. In some embodiments, the processor computes the radial clearance between the seal and the turbine blade tip based on the computed position of the turbine blade tip relative to the baseline position. In some embodiments, the baseline position is based on at least one of an axial position of the case or an axial position of the seal. In some embodiments, the first transmitter and the second transmitter are a common transmitter, and the first optical signal and the second optical signal are a common optical signal. In some embodiments, the first transmitter and the second transmitter are a common transmitter, and the first optical signal and the second optical signal are different optical signals. In some embodiments, the third position is a first circumferential position of the third receiver, and the fourth position is a second circumferential position of the fourth receiver, and the second circumferential position is different from the first circumferential position.

Aspects of the disclosure are directed to a method comprising: obtaining a first position of a first receiver of a plurality of receivers and a second position of a second receiver of the plurality of receivers, transmitting, by a first transmitter, a first optical signal towards a target that includes a knife edge of a turbine blade of a turbomachine, capturing, by the plurality of receivers, the first optical signal after the first optical signal is reflected by the target, and computing, by a processor, a third position of the target relative to a baseline position based on: the captured first optical signal as provided by the plurality of receivers, the first position, and the second position. In some embodiments, the method further comprises: transmitting, by a second transmitter, a second optical signal towards the target, capturing, by the plurality of receivers, the second optical signal after the second optical signal is reflected by the target, computing, by the processor, a fourth position of the target relative to the baseline position based on: the captured second optical signal as provided by the plurality of receivers, the first position, and the second position. In some embodiments, the method further comprises: determining, by the processor, a probable position of the target based on the third position and the fourth position. In some embodiments, the processor computes the third position of the target based on a first intensity value captured by the first receiver and a second intensity value captured by the second receiver. In some embodiments, the method further comprises: obtaining a fourth position of a third receiver of the plurality of receivers and a fifth position of a fourth receiver of the plurality of receivers, transmitting, by a second transmitter, a second optical signal towards the target, capturing, by the plurality of receivers, the second optical signal after the second optical signal is reflected by the target, and computing, by the processor, a first clearance between the target and a component based on: the captured second optical signal as provided by the plurality of receivers, the fourth position, and the fifth position. In some embodiments, the first transmitter and the second transmitter are a common transmitter. In some embodiments, the first optical signal and the second optical signal are a common optical signal. In some embodiments, the method further comprises: transmitting, by a third transmitter, a third optical signal towards the target, capturing, by the plurality of receivers, the third optical signal after the third optical signal is reflected by the target, and computing, by the processor, a second clearance between the target and the component based on: the captured third optical signal as provided by the plurality of receivers, the fourth position, and the fifth position. In some embodiments, the method further comprises: determining, by the processor, a probable clearance between the target and the component based on the first clearance and the second clearance. In some embodiments, the processor computes the first clearance based on the third position. In some embodiments, the component includes a seal of the turbomachine.

BRIEF DESCRIPTION OF THE DRAWINGS

The present disclosure is illustrated by way of example and not limited in the accompanying figures in which like reference numerals indicate similar elements. The figures are not necessarily drawn to scale unless explicitly indicated otherwise.

DETAILED DESCRIPTION

Figure 1:
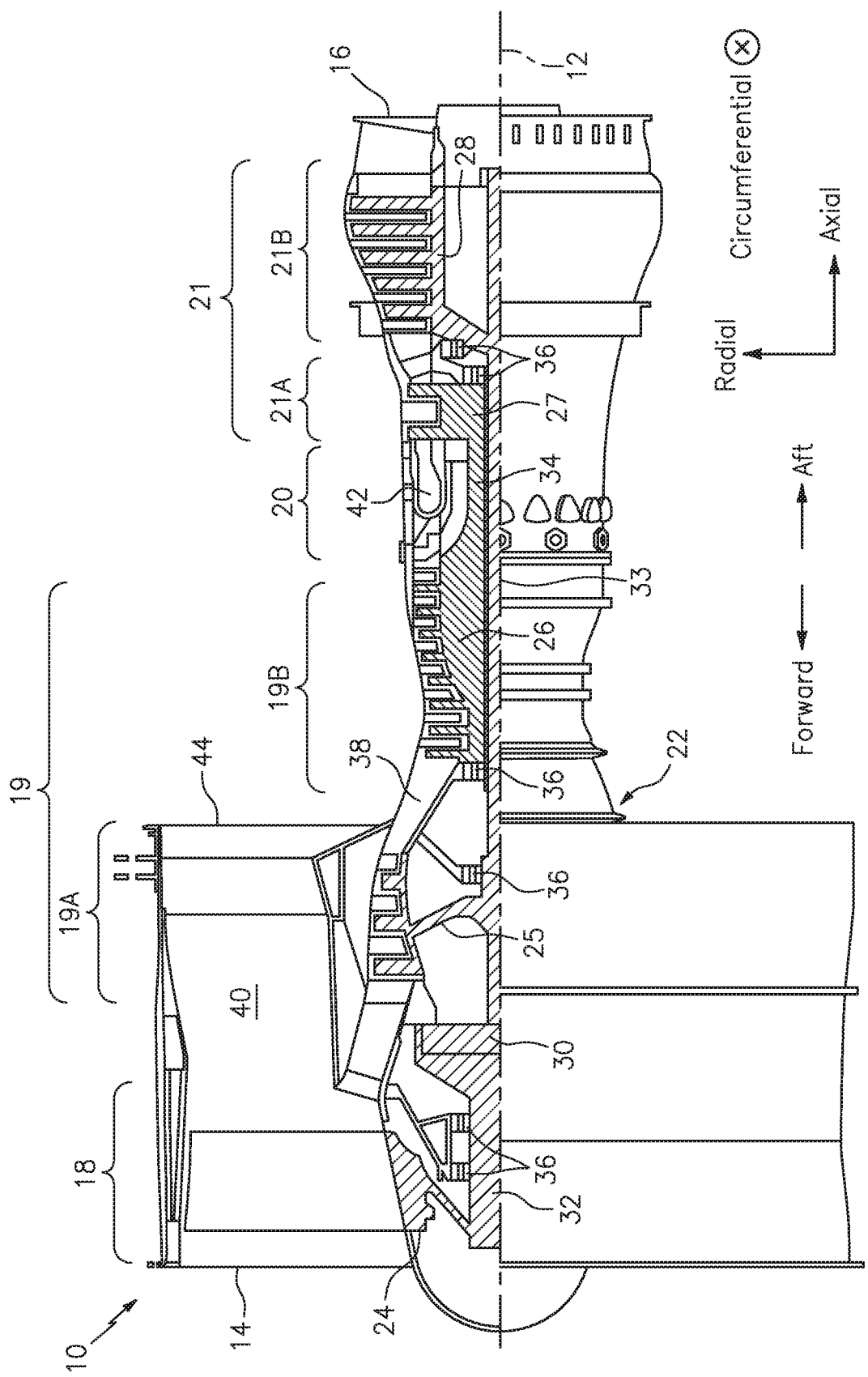
FIG. 1 is a side cutaway illustration of a gas turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities and/or a space/gap between entities.

By way of introduction, aspects of the disclosure are directed to methods, systems, and apparatuses that are used to obtain information regarding a blade tip clearance (BTC) and an axial shift/displacement or position of a blade (or associated knife edge). In some embodiments, a signal (e.g., an optical signal) transmitted by a transmitter is directed towards a target (e.g., the knife edge). At least a portion of the signal is reflected by the target and registers with at least one receiver of an array of receivers. The arrangement of the receivers may enable an acquisition of information/data that uniquely defines each BTC and axial shift/position condition/state.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36 (e.g., rolling element and/or thrust bearings). Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path/duct 38 and a bypass gas path/duct 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine. Aspects of the disclosure may be applied in connection with other environments, including additional configurations for engines. For example, aspects of the disclosure may be applied in connection with turbofan engines, turboprops, turboshafts, etc. Aspects of the disclosure may be applied in connection with radial gas turbine engines and/or hybrid gas turbine engines. Aspects of the disclosure may be applied in connection with one or more turbomachines/turbomachinery applications.

Figure 2:
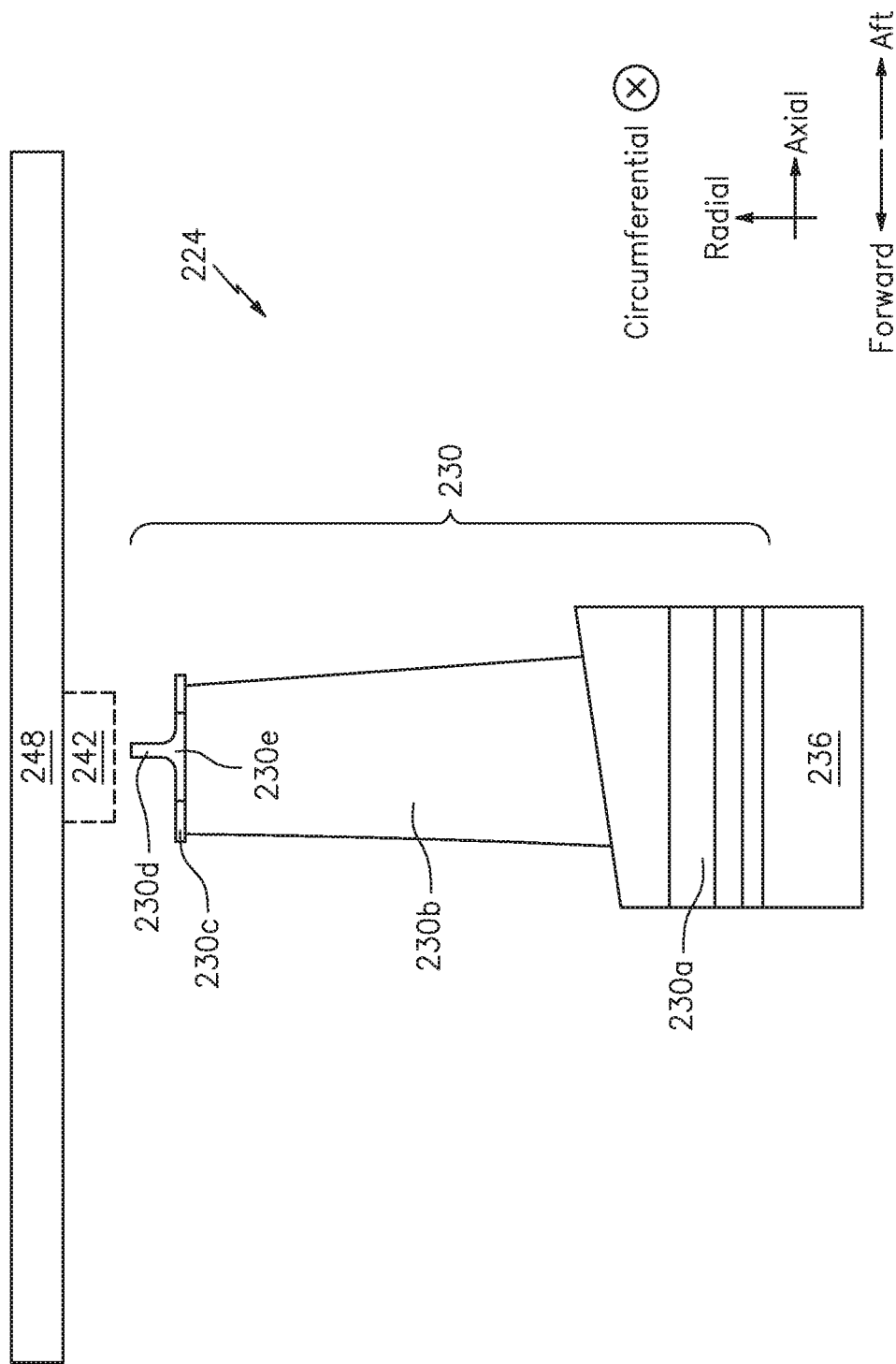
FIG. 2 illustrates a portion of a turbine section of an engine in accordance with various embodiments.

Referring to FIG. 2, a portion of a turbine section 224 of an engine is shown. The turbine section 224 may correspond to the turbine section 21 of FIG. 1. While the description below applies to the turbine section 224, aspects of this disclosure may be applied to other sections of an engine, such as for example a compressor section of the engine, a fan section of an engine, etc.

A blade 230 may include a root 230a, an airfoil 230b, a platform 230c, and a tip/knife edge 230d. The radial outer surface of the platform 230c may include, or be coupled to, a blade shroud 230e.

The root 230a may be seated in a disk 236. The airfoil 230b may extend radially outward from the root 230a to the platform 230c. The knife edge 230d may extend from the platform 230c and interface to a blade outer air seal (BOAS) 242. The BOAS 242 may be coupled to a case 248 of the engine.

Figure 2A:
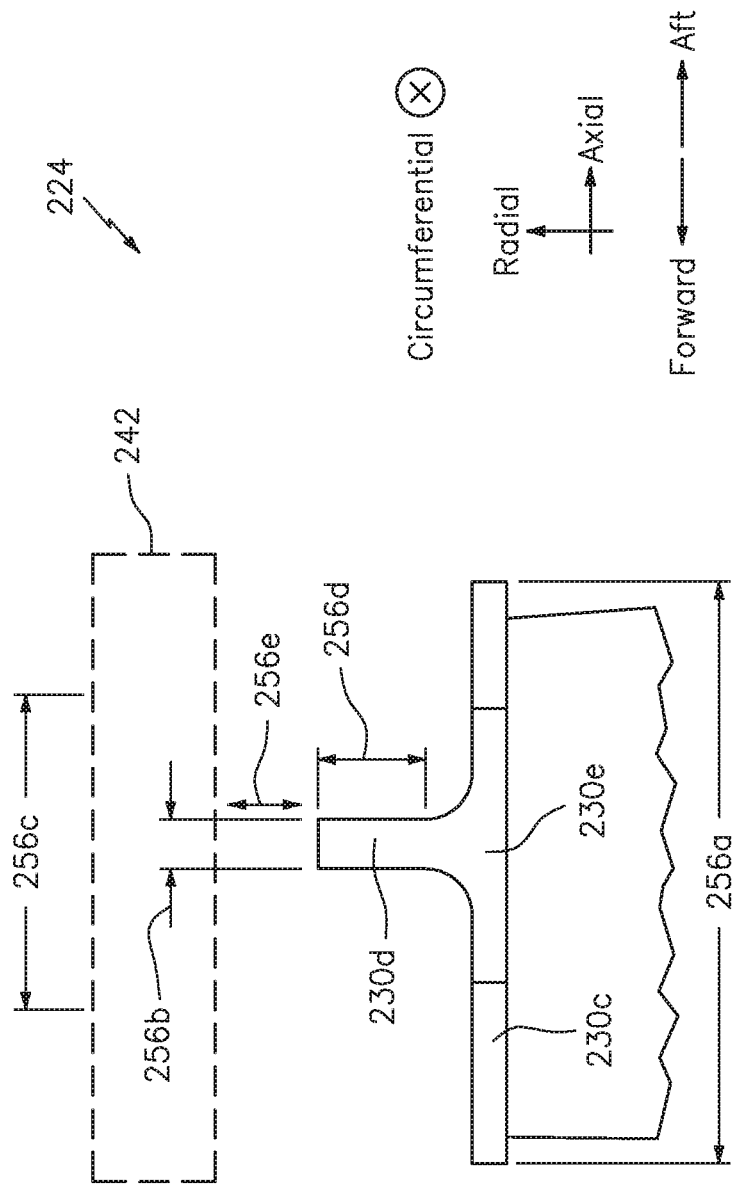
FIG. 2A illustrates the portion of the turbine section of FIG. 2 in additional detail.

Referring to FIG. 2A, a closer view of the platform 230c, the knife edge 230d, the blade shroud 230e, and the BOAS 242 of FIG. 2 is shown. Also superimposed in FIG. 2A are various distances/arrows that are described further below.

A first distance 256a corresponds to a (n axial) distance between a forward edge of the platform 230c and an aft edge of the platform 230c.

A second distance 256b corresponds to an (axial) width of the knife edge 230d.

A third distance 256c represents a range of (axial) shift/displacement that the blade 230/knife edge 230d may incur over the operational envelope of the engine. For example, taking the scenario depicted in FIG. 2A as a baseline/reference position, the knife edge 230d may be displaced axially forward or axially aft (from the baseline position). over the range 256c.

A fourth distance 256d represents a (radial) height/length of the knife edge 230d relative to the horizontal/axial reference direction (where the axial reference direction intersects with the blade shroud 230e).

As represented by (the lengths of) the arrows shown in FIG. 2A, the range of axial displacement that the knife edge 230d may incur (as represented by the range/span of the third distance 256c) may be substantially greater than the width of the knife edge 230d (as represented by the second distance 256b). Also, the profile of the platform 230c/blade shroud 230e might not be flat (e.g., might not be aligned purely in the axial direction). Instead, the platform 230c may progress radially (e.g., radially outward/outboard) from the forward edge of the platform 230c to the aft edge of the platform 230c. Accordingly, the BTC between the knife edge 230d and the BOAS 242 may be a function of where the knife edge 230d is located within the axial span/range represented by the third distance 256c. Thus, knowledge of the axial location of the knife edge 230d within the range represented by the third distance 256c may lead to a more accurate characterization/determination of the BTC.

Figure 2B:
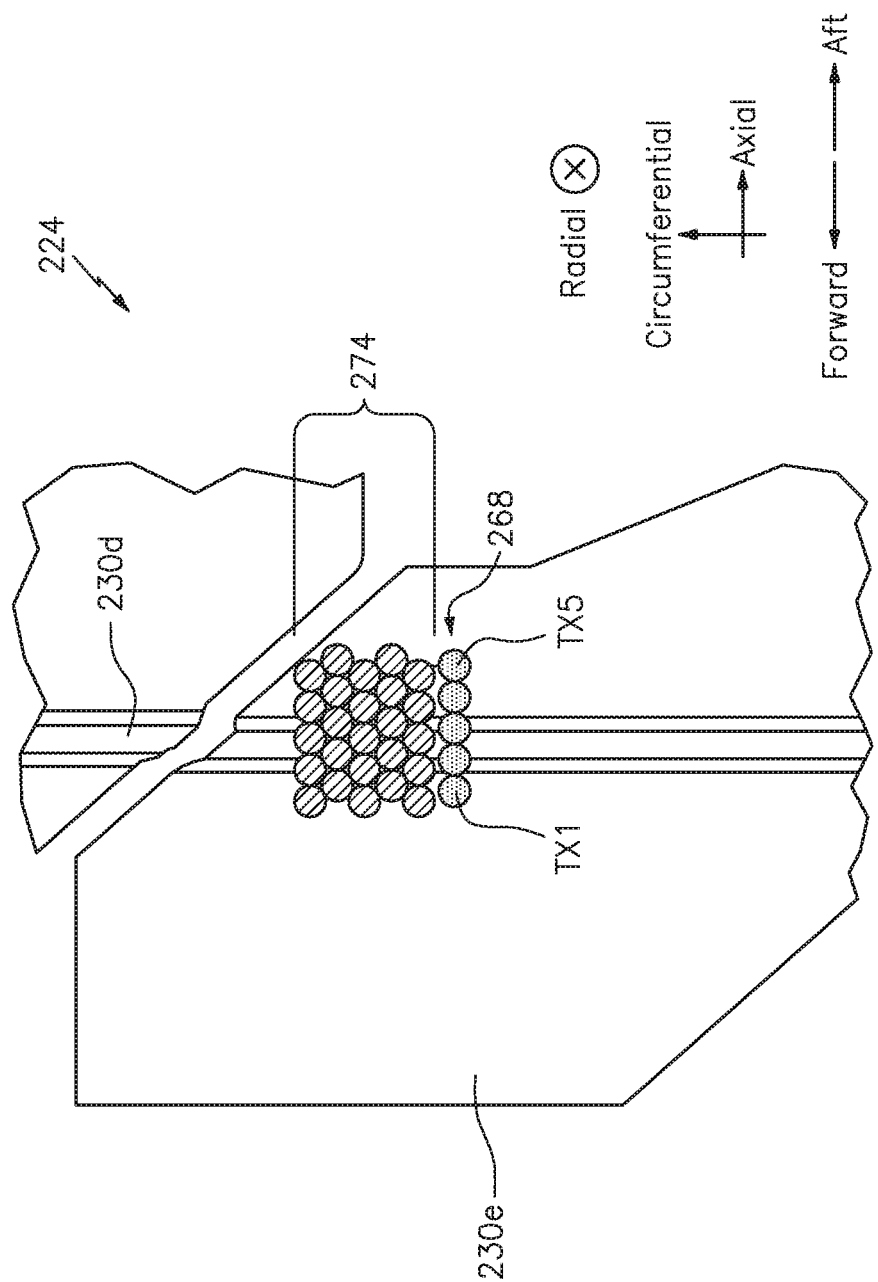
FIG. 2B illustrates one or more transmitters and one or more receivers proximate a knife edge of the turbine section of FIGS. 2-2A in accordance with various embodiments.

Referring to FIG. 2B, during one or more activities (e.g., design, test, etc.) one or more probes may be positioned relative to a component to qualify/characterize a parameter of the component. For example, one or more probes may be positioned proximate the knife edge 230d to characterize/determine a BTC and/or a position (e.g., an axial position) of the knife edge 230d. A probe may include one or more of the components described below.

A probe may include a transmit (TX) array 268 (shown in FIG. 2B with a dotted/speckled profile) and a receive (RX) array 274 (shown in FIG. 2B with a striped profile). While multiple (e.g., five) transmitters are shown in FIG. 2B as part of the TX array 268, any number of transmitters (greater than or equal to one transmitter) may be included in the TX array 268. Similarly, the RX array 274 may include one or more receivers.

The count of transmitters included in the TX array 268 and/or the count of the receivers included in the RX array 274 may be selected as a function of one or more parameters. For example, the counts may be based on an output capability (e.g., output power) of the transmitter(s), a range of axial displacement that the knife edge 230d may incur (as represented by the third distance/arrow 256c in FIG. 2A), a range in the value of the BTC (where the BTC is represented by the fifth distance 256e between the knife edge 230d and the BOAS 242 in FIG. 2A) over the range represented by the third distance 256c, a resolution that is required/desired for the particular application/engine at hand, etc.

The transmitter(s) of the TX array 268 may transmit one or more signals that may be received by one or more receivers of the RX array 274. In some embodiments, the transmitters may include one or more optical transmitters (e.g., lasers) that may transmit optical/light signal(s) at one or more wavelengths (or, analogously, one or more frequencies).

The signal(s) output by the transmitters may be acquired by one or more of the receivers. The receivers, in turn, may provide the acquired signals to one or more photodetectors. For example, and referring to FIGS. 2B and 3A, receivers RX1, RX2, RX3, RX4, RX5, and RX6 of the RX array 274 each may be coupled to a (single) photodetector 306. In some embodiments, more than one photodetector may be used. For example, FIG. 3B illustrates an embodiment where the receivers RX1, RX2, and RX3 are coupled to a first photodetector 306a and the receivers RX4, RX5, and RX6 are coupled to a second photodetector 306b. More generally, a given photodetector may be coupled to the output of at least one receiver. The photodetector(s) 306/306a/306b may convert optical signal(s)/photons to electrical signal(s) (e.g., electrical current signal(s)).

Figure 3A:
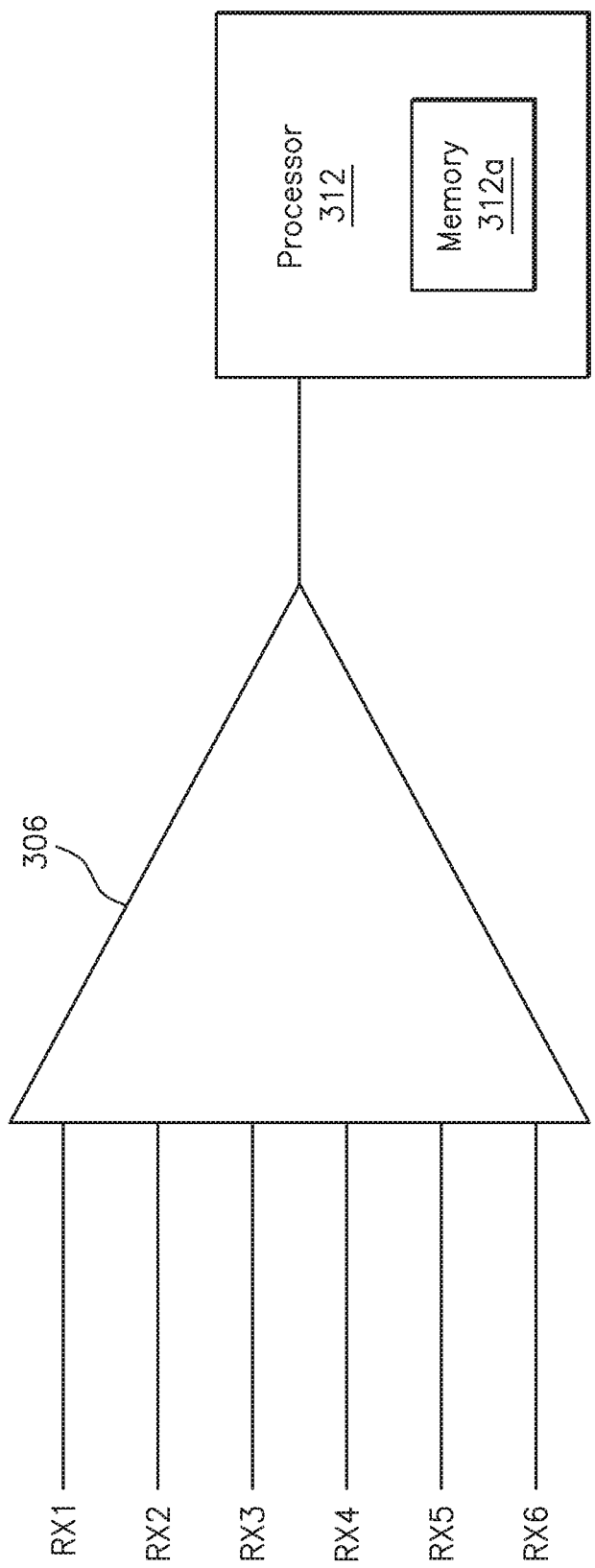
FIG. 3A illustrates a system for coupling receivers to a processor via a photodetector in accordance with various embodiments.
Figure 3B:
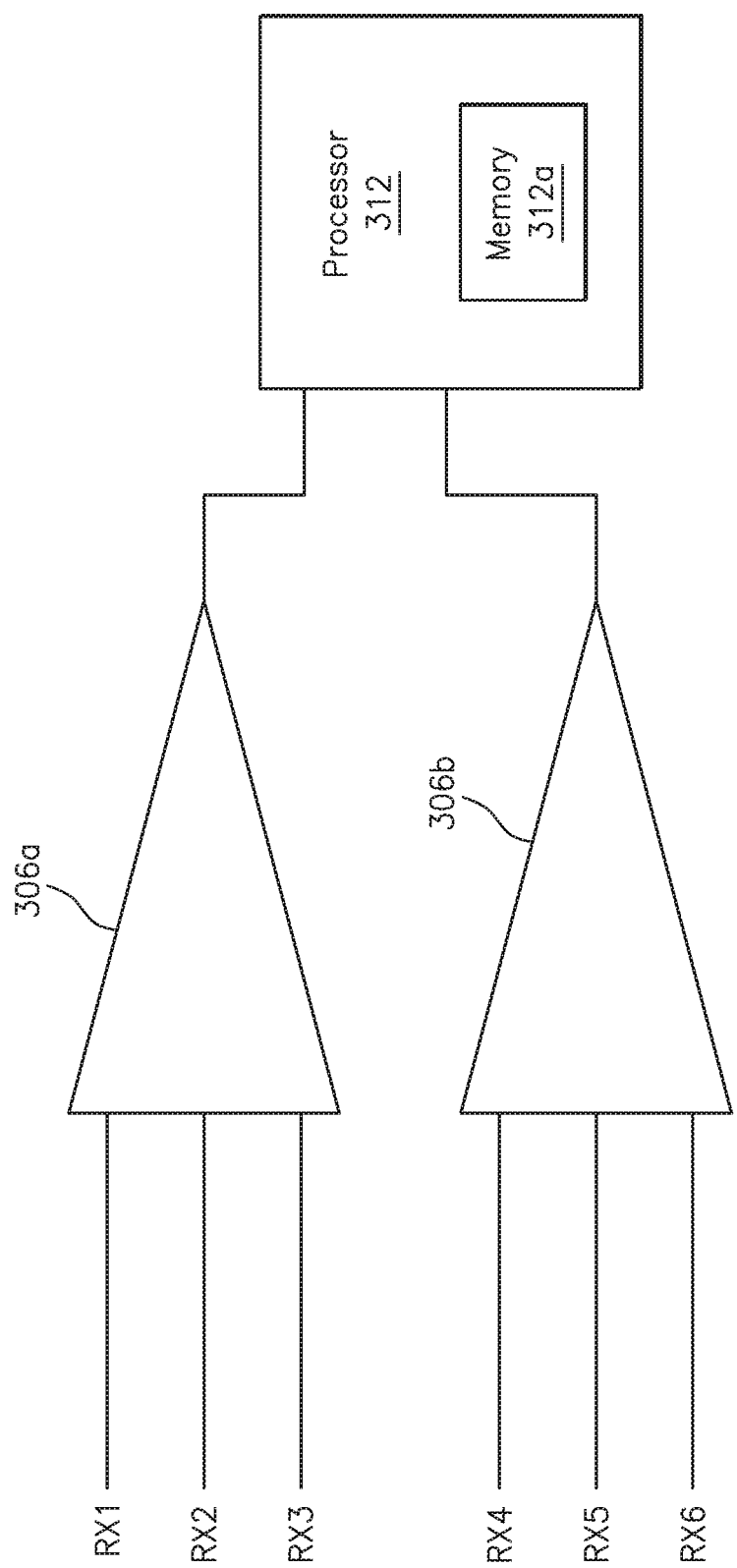
FIG. 3B illustrates a system for coupling receivers to a processor via a plurality of photodetectors in accordance with various embodiments.

As shown in FIGS. 3A and 3B, an output of a photodetector 306/306a/306b may be coupled to a processor 312. The processor 312 may execute one or more algorithms that may compute/determine the BTC and/or an axial position (or, analogously, an axial displacement relative to a baseline position) of the knife edge 230d as discussed further below.

In operation, a given transmitter (e.g., a transmitter TX, such as transmitter TX1—see FIGS. 2B and 4) may transmit a signal towards a target (e.g., blade/knife edge 230d). One or more receivers (e.g., receivers RXs, such as RX1 through RX5—see FIGS. 3A-4) located at different (circumferential) locations may capture/receive the signal after the signal is reflected by the target with different values of intensity. The intensity values reported/provided by the receiver(s) may be processed by a processor (e.g., the processor 312 of FIGS. 3A-3B) to determine a BTC value. For example, the intensity values as captured by the receivers RX1-RX5, as a function of the respective circumferential location of the receivers RX1-RX5, uniquely correspond to a BTC value. A BTC value may be computed per circumferential receiver array. The procedure may be repeated for additional transmitters of the TX array 268 (if there are such additional transmitters present—e.g., transmitter TX5 of FIG. 2B).

The axial position of the target (e.g., the knife edge 230d) within the range represented by the span/distance 256c (see FIG. 2A) may be determined based on acquired intensity values obtained by receivers located at different (axial) positions. A signal that is transmitted by, e.g., the transmitter TX1, reflected by the target (e.g., the knife edge 230d), and captured by the receivers may be received by the receivers with different intensity values. The intensity values may be processed by the processor 312 (see FIGS. 3A-3B) as a function of the respective axial positions of the receivers to compute an axial position of the target for the given transmitter TX1. The count of receivers that are used may be selected based on the potential full range of motion/displacement of the target. The procedure may be repeated for additional transmitters of the TX array 268 (if there are such additional transmitters present—e.g., transmitter TX5 of FIG. 2B).

Figure 4:
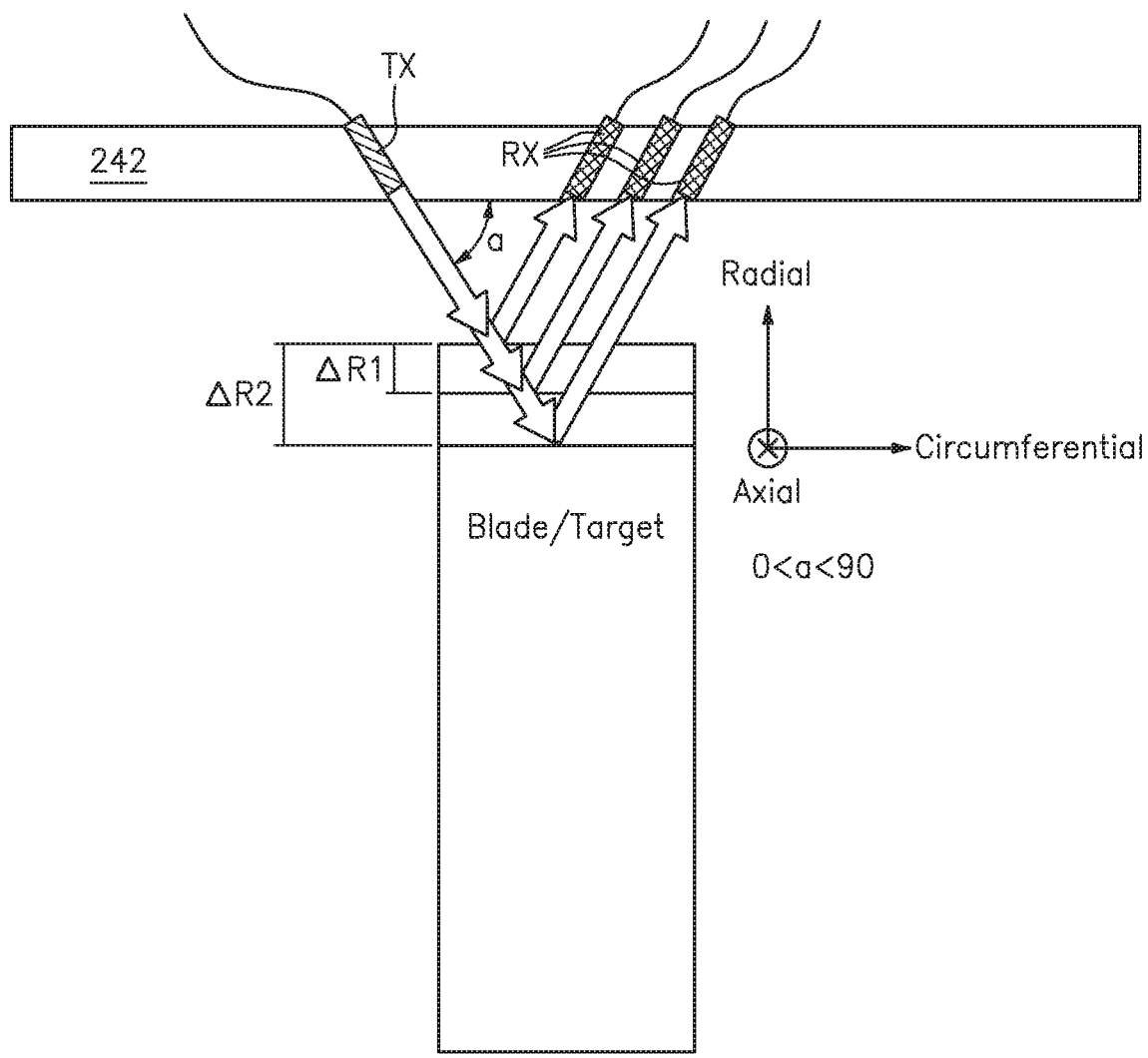
FIG. 4 illustrates an arrangement of a transmitter and receivers to determine a clearance and/or a position in accordance with various embodiments.

In FIG. 4, the receivers RX are shown as receiving signals reflected by the target based on a radial clearance between the target and the BOAS 242. For example, the radial distance delta R1 may represent a first change in terms of a radial clearance and the radial distance delta R2 may represent a second change in terms of a radial clearance.

In some embodiments, an angle (e.g., angle alpha in FIG. 4) between, e.g., the circumferential reference direction and the transmission of the signal by a TX may be selected to be within a range of 0 degrees and 90 degrees. A smaller value of the angle alpha may increase/enhance the sensitivity of the measurement/calculation provided in conjunction with, e.g., the methods 500 and 550 of FIGS. 5A-5B described below. However, a larger value of the angle alpha may facilitate a smaller packaging/form factor. Accordingly, a trade-off may be made between sensitivity and packaging. Furthermore, in some embodiments the angle alpha may be tuned to reduce (e.g., eliminate) reflection associated with, e.g., the blade shroud 230e—see FIGS. 2-2B. This reduction in reflection may enhance the calculation/determination of a position and/or a clearance (e.g., a BTC) as described further below.

Figure 5A:
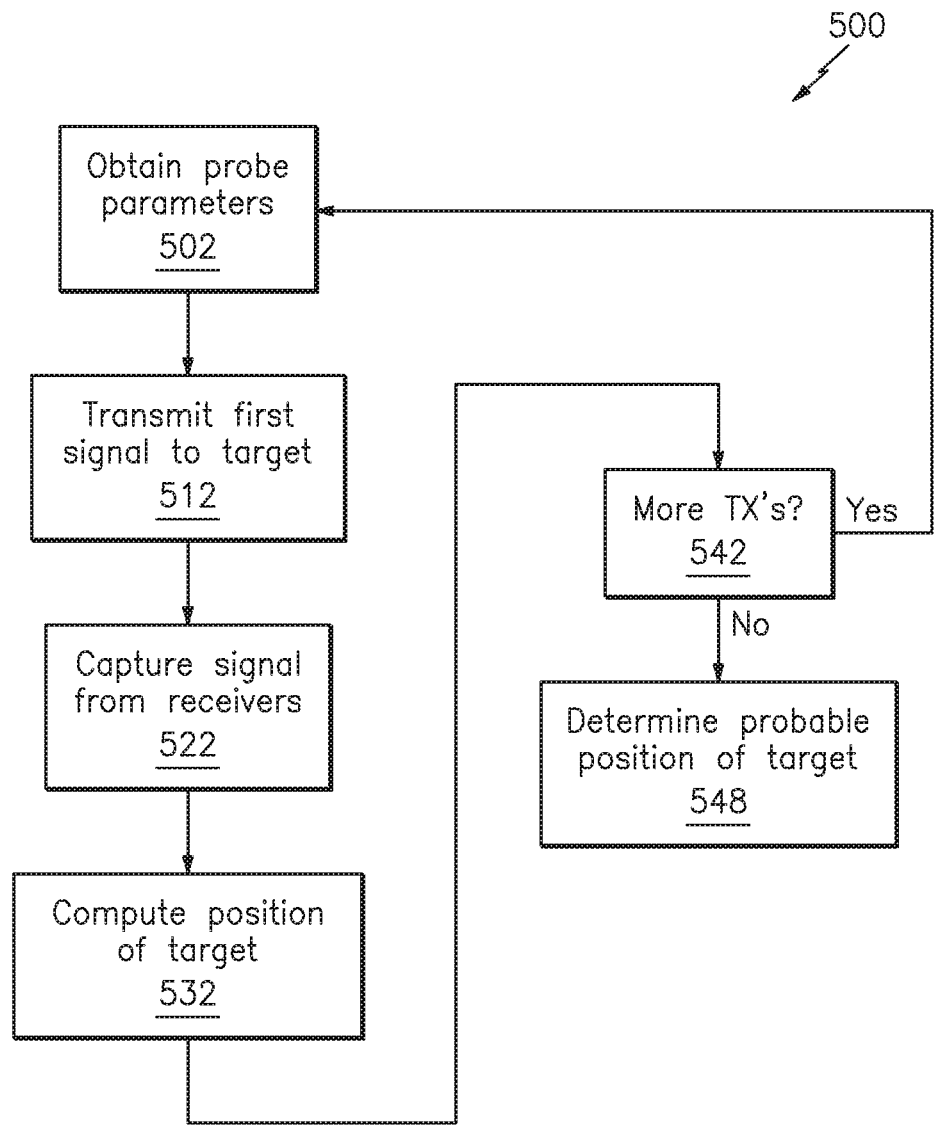
FIG. 5A illustrates a flow chart of a method for determining a probable position of a target in accordance with various embodiments.

Referring to FIG. 5A, a flow chart of a method 500 is shown. The method 500 may be used to compute a position (e.g., an axial position) of a target (e.g., a knife edge 230d—see, e.g., FIGS. 2-2A). In some embodiments, the method 500 may be executed by one or more components or devices, such as for example the processor 312 of FIGS. 3A-3B. The execution of the method 500 may be based on the processor 312 executing instructions stored in a memory (e.g., memory 312a of FIGS. 3A-3B).

In block 502, one or more parameters associated with a probe may be obtained/determined. For example, parameters concerning an orientation or position of one or more transmitters (TXs) and/or one or more receivers (RXs), a transmit power, wavelength, and/or frequency of the transmission, etc., may be obtained as part of block 502. In some embodiments, the parameters of block 502 may be stored in the memory 312a.

In block 512, a (first) signal may be transmitted by at least one of the TXs to the target. The transmission of block 512 may be oriented such that the signal is incident to the target an angle from the radial normal associated with the target.

In block 522, the RXs may capture the signal after the signal of block 512 is reflected from the target. The signals may be captured as (an array of) intensity values, where each intensity value may be a function of a position (e.g., an axial position) of a respective RX. The capture of block 522 may be based on the use of one or more photodetectors (e.g., photodetectors 306/306a/306b—see FIGS. 3A-3B).

In block 532, a position (e.g., an axial position) of the target may be computed. The position computed in block 532 may be based on the signals (e.g., intensity values) captured in block 522 and/or the parameters of block 502. The position of block 532 may be established relative to a reference/baseline position (e.g., a position associated with the BOAS 242 and/or the case 248—see, e.g., FIGS. 2-2A).

In some embodiments, one or more of the blocks 502-532 may be executed once per TX to establish an array of positions of the target (e.g., one position calculated per TX). Thus, in block 542 a determination may be made whether there are additional TXs to use. Thereafter, in block 548 one or more algorithms (e.g., filtering and/or weighting algorithms) may be implemented/executed to determine the likely/probable position of the target based on the array of positions. In some embodiments, the signal(s) from the photodetector(s) may be analyzed to determine/evaluate a signature/profile of the intensity values obtained by the receiver(s) to determine the position of the target. By using multiple TXs, enhanced resolution/clarity in the calculation of the position may be obtained. More generally, multiple arrays of TXs and/or RXs may be used to determine the likely/probably position of the target.

While described above as occurring sequentially, in embodiments where multiple TXs are present the TXs may transmit their respective signals at the same time (e.g., in parallel with one another). Different signal characteristics (e.g., frequency, wavelength, etc.) may be used to distinguish a signal from a first TX from a signal from a second TX.

Figure 5B:
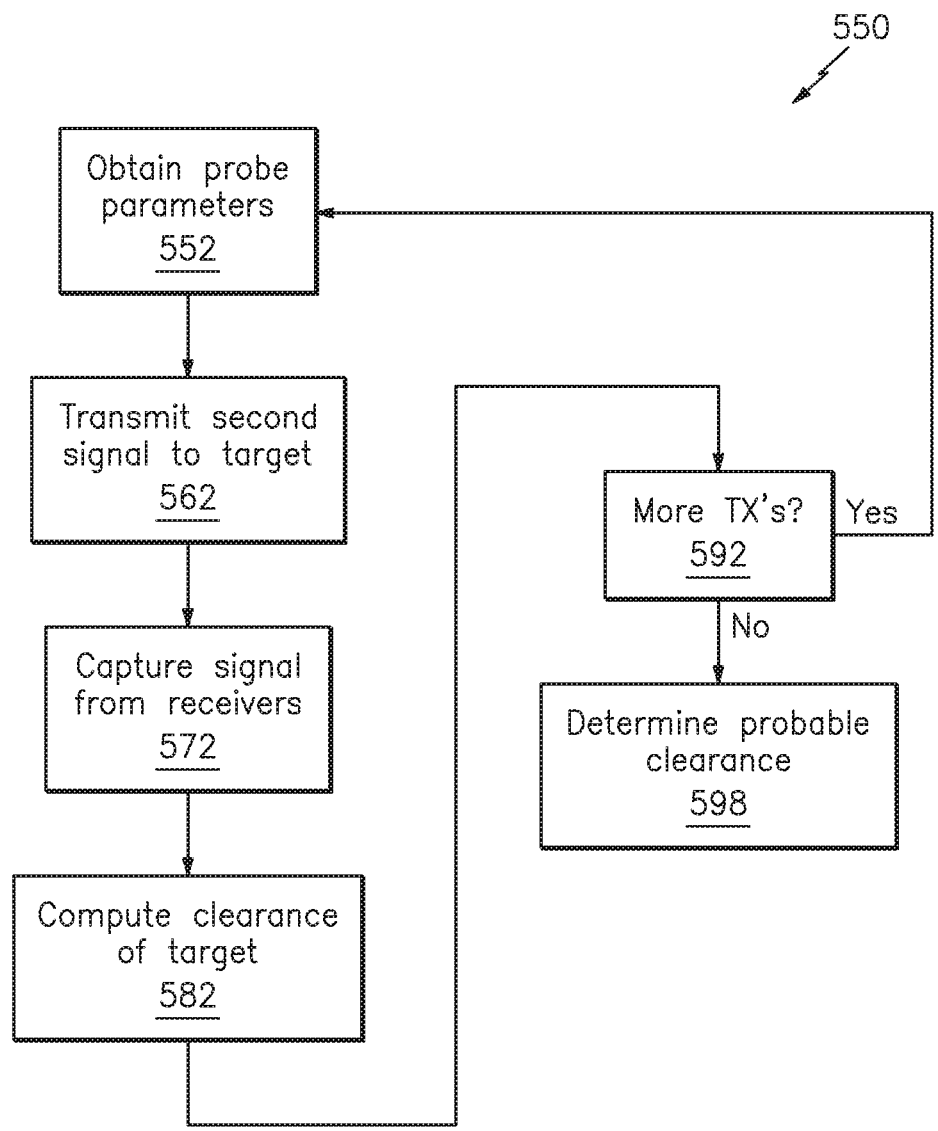
FIG. 5B illustrates a flow chart of a method for determining a probable clearance between a target and a component in accordance with various embodiments.

Referring to FIG. 5B, a flow chart of a method 550 is shown. The method 550 may be used to compute a clearance between a target (e.g., knife edge 230d—see, e.g., FIGS. 2-2A) and a component (e.g., BOAS 242—see, e.g., FIGS. 2-2A). In some embodiments, the method 550 may be executed by one or more components or devices, such as for example the processor 312 of FIGS. 3A-3B. The execution of the method 550 may be based on the processor 312 executing instructions stored in the memory 312a.

In block 552, one or more parameters associated with a probe may be obtained/determined. For example, parameters concerning an orientation or position of one or more transmitters (TXs) and/or one or more receivers (RXs), a transmit power, wavelength, and/or frequency of the transmission, etc., may be obtained as part of block 552. In some embodiments, the parameters of block 552 may be stored in the memory 312a. While described as a separate block, in some embodiments block 552 may correspond to block 502 of FIG. 5A.

In block 562, a (second) signal may be transmitted by at least one of the TXs to the target. The transmission of block 562 may be oriented such that the signal is incident to the target an angle from the radial normal associated with the target. While described as a separate block, in some embodiments block 562 may correspond to block 512 of FIG. 5A. In other words, the first signal of block 512 of FIG. 5A may be the same signal as the second signal of block 562 of FIG. 5B (e.g., the signals of block 512 and block 562 may be a common signal transmitted by a common transmitter). In some embodiments, the first signal of block 512 of FIG. 5A may be a different signal from the second signal of block 562 of FIG. 5B.

In block 572, the RXs may capture the signal after the signal of block 562 is reflected from the target. The signals may be captured as (an array of) intensity values, where each intensity value may be a function of a position (e.g., a circumferential position) of a respective RX. The capture of block 572 may be based on the use of one or more photodetectors (e.g., photodetectors 306/306a/306b—see FIGS. 3A-3B).

In block 582, a clearance value between the target and the component may be computed. The clearance computed in block 582 may be based on the signals (e.g., intensity values) captured in block 572 and/or the parameters of block 552.

In some embodiments, one or more of the blocks 552-582 may be executed once per TX to establish an array of clearance values (e.g., one clearance value calculated per TX). Thus, in block 592 a determination may be made whether there are additional TXs to use. Thereafter, in block 598 one or more algorithms (e.g., filtering and/or weighting algorithms) may be implemented/executed to determine the likely/probable clearance value based on the array of clearance values. In some embodiments, the signal(s) from the photodetector(s) may be analyzed to determine/evaluate a signature/profile of the intensity values obtained by the receiver(s) to determine the clearance value. By using multiple TXs, enhanced resolution/clarity in the calculation of the position may be obtained.

While described as occurring sequentially, in embodiments where multiple TXs are present the TXs may transmit their respective signals at the same time (e.g., in parallel with one another). Different signal characteristics (e.g., frequency, wavelength, etc.) may be used to distinguish a first signal transmitted by a first TX from a second signal transmitted by a second TX.

In some embodiments, the method 500 may be executed first to determine a (probable) position (e.g., an axial position) of the target. Thereafter, and based on the determined position of the target, the method 550 may be executed to determine a (probable) clearance between the target and a component. Multiple executions/iterations of the methods 500 and 550 may help to reduce measurement uncertainty. For example, a calculated axial location of a target can inform a calculation of a BTC by providing information/data to locate upon a feature more accurately; the BTC can, in turn, help in determining an axial location.

Aspects of the methods 500 and 550 may be executed in conjunction with one another. For example, aspects of the methods 500 and 550 may be executed in parallel with one another. In accordance with aspects of this disclosure, a position (e.g., an axial position) of a target and a clearance (e.g., a BTC/radial closedown) between that target and another component may be measured simultaneously. A multi-core or multi-threaded processor may be used to provide for parallel processing/determination of position and clearance in some embodiments.

While the methods 500 and 550 are described above in relation to iterating over a number of transmitters (e.g., blocks 542 and 592), other parameters (e.g., signal power, wavelength, frequency, etc.) may be iterated/adjusted to enhance/increase accuracy, resolution, or redundancy/reliability in measurement.

Aspects of the disclosure may be used to characterize a clearance or a position associated with a target. The target may include a knife edge or blade tip associated with one or more of a fan section, a compressor section, or a turbine section of, e.g., an engine. The target may include a rotatable structure and/or a static/stationary structure.

Aspects of the disclosure may be used to measure circumferentially continuous rotating turbomachinery components, such as for example shrouded turbine blades. Aspects of the disclosure may be used to measure more general geometries. Unlike a capacitive based clearance probe, aspects of the disclosure might not require a blade passing to measure clearance and may measure continuous surfaces. Aspects of the disclosure may examine/process a reflected light source, such that a measurement can be made with respect to a body/structure that is present within the working range of the reflected light. Accordingly, aspects of the disclosure may be applied to non-continuous geometries, such as for example unshrouded blades.

Aspects of the disclosure are directed to a laser-based blade tip clearance measurements/determinations. For example, a single circumferential receive array may be used to measure/determine a blade tip clearance. When an axial plurality of such circumferential receive arrays is installed to encompass the anticipated axial shift of a target, the response of the two-dimensional array may uniquely identify both axial shift and clearance (e.g., blade tip clearance) measurements. As described above, aspects of the disclosure may be used with non-continuous geometries; the use of such geometries may take into account untwist and vibratory modes of the target should any such occur.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A system for use on a turbomachine having a longitudinal axial centerline, the system comprising:
    a case;

a seal coupled to the case and radially disposed between the case and a turbine blade tip of a target relative to the centerline;
a first transmitter that transmits a first optical signal towards the target;
a second transmitter that transmits a second optical signal toward the turbine blade tip;
a plurality of receivers that receive the first optical signal after the first optical signal is reflected by the target, and each receiver provides a respective first received optical signal, and the second optical signal after the second optical signal is reflected by the turbine blade tip, and each receiver provides a respective second received optical signal;
at least one photodetector that receives the first received optical signals and the second received optical signals and provides at least a first electrical signal and a second electrical signal, respectively; and
a processor that receives the first electrical signal to compute a position of the target relative to a baseline position based on:
a first position of a first receiver of the plurality of receivers,
a second position of a second receiver of the plurality of receivers, and
the first electrical signal;
wherein the processor computes a radial clearance between the seal and the turbine blade tip based on:
a third position of a third receiver of the plurality of receivers,
a fourth position of a fourth receiver of the plurality of receivers, and
the second electrical signal; and
wherein the first position corresponds to a first axial position relative to the centerline, and wherein the second position corresponds to a second axial position relative to the centerline, and wherein the second axial position is different from the first axial position.

2. The system of claim 1, wherein the processor computes the radial clearance between the seal and the turbine blade tip based on the computed position of the turbine blade tip relative to the baseline position.

3. The system of claim 1, wherein the baseline position is based on at least one of an axial position of the case or an axial position of the seal.

4. The system of claim 1, wherein the first transmitter and the second transmitter are a common transmitter, and the first optical signal and the second optical signal are a common optical signal.

5. The system of claim 1, wherein the first transmitter and the second transmitter are a common transmitter, and the first optical signal and the second optical signal are different optical signals.

6. The system of claim 1, wherein the third position is a first circumferential position of the third receiver, and wherein the fourth position is a second circumferential position of the fourth receiver, and wherein the second circumferential position is different from the first circumferential position.

7. A method comprising:
obtaining a first position of a first receiver of a plurality of receivers and a second position of a second receiver of the plurality of receivers;
transmitting, by a first transmitter, a first optical signal towards a target that includes a knife edge of a turbine blade of a turbomachine;
transmitting, by a second transmitter, a second optical signal towards the target;
capturing, by the plurality of receivers, the first optical signal after the first optical signal is reflected by the target;
capturing, by the plurality of receivers, the second optical signal after the second optical signal is reflected by the target;
computing, by a processor, a third position of the target relative to a baseline position based on:
the captured first optical signal as provided by the plurality of receivers,
the first position, and
the second position; and
computing, by the processor, a fourth position of the target relative to the baseline position based on:
the captured second optical signal as provided by the plurality of receivers,
the first position, and
the second position.

8. The method of claim 7, further comprising:
determining, by the processor, a probable position of the target based on the third position and the fourth position.

9. The method of claim 7, wherein the processor computes the third position of the target based on a first intensity value captured by the first receiver and a second intensity value captured by the second receiver.

10. The method of claim 7, further comprising:
obtaining a fifth position of a third receiver of the plurality of receivers and a sixth position of a fourth receiver of the plurality of receivers;
transmitting, by a second transmitter, a second optical signal towards the target;
capturing, by the plurality of receivers, the second optical signal after the second optical signal is reflected by the target; and
computing, by the processor, a first clearance between the target and a component based on:
the captured second optical signal as provided by the plurality of receivers,
the fifth position, and
the sixth position.

11. The method of claim 10, wherein the first transmitter and the second transmitter are a common transmitter.

12. The method of claim 11, wherein the first optical signal and the second optical signal are a common optical signal.

13. The method of claim 10, further comprising:
transmitting, by a third transmitter, a third optical signal towards the target;
capturing, by the plurality of receivers, the third optical signal after the third optical signal is reflected by the target; and
computing, by the processor, a second clearance between the target and the component based on:
the captured third optical signal as provided by the plurality of receivers,
the fifth position, and
the sixth position.

14. The method of claim 13, further comprising:
determining, by the processor, a probable clearance between the target and the component based on the first clearance and the second clearance.

15. The method of claim 10, wherein the processor computes the first clearance based on the third position.

16. The method of claim 10, wherein the component includes a seal of the turbomachine.

\* \* \* \* \*